US012589350B2

(12) United States Patent
Takeda et al.

(10) Patent No.: US 12,589,350 B2
(45) Date of Patent: Mar. 31, 2026

(54) COMPOSITION FOR CARBON DIOXIDE ABSORPTION

(71) Applicants: SANYO CHEMICAL INDUSTRIES, LTD., Kyoto (JP); NIHON UNIVERSITY, Tokyo (JP)

(72) Inventors: Takuma Takeda, Kyoto (JP); Koichi Mori, Kyoto (JP); Akihiro Manbo, Kyoto (JP); Daisuke Kodama, Tokyo (JP)

(73) Assignees: SANYO CHEMICAL INDUSTRIES, LTD., Kyoto (JP); NIHON UNIVERSITY, Tokyo (JP)

( * ) Notice: Subject to any disclaimer, the term of this patent is extended or adjusted under 35 U.S.C. 154(b) by 217 days.

(21) Appl. No.: 18/708,493

(22) PCT Filed: Oct. 17, 2022

(86) PCT No.: PCT/JP2022/038582

§ 371 (c)(1),
(2) Date: May 8, 2024

(87) PCT Pub. No.: WO2023/085001

PCT Pub. Date: May 19, 2023

(65) Prior Publication Data

US 2025/0018330 A1 Jan. 16, 2025

(30) Foreign Application Priority Data

Nov. 12, 2021 (JP) ................................ 2021-184952

(51) Int. Cl.
*B01D 53/14* (2006.01)

(52) U.S. Cl.
CPC ..... *B01D 53/1493* (2013.01); *B01D 53/1475* (2013.01); *B01D 2252/20473* (2013.01); *B01D 2252/30* (2013.01); *B01D 2252/504* (2013.01); *B01D 2252/604* (2013.01); *B01D 2257/504* (2013.01)

(58) Field of Classification Search
CPC ............ B01D 53/1493; B01D 53/1475; B01D 2252/20473; B01D 2252/30; B01D 2252/504; B01D 2252/604; B01D 2257/504; C01B 32/50; Y02C 20/40
See application file for complete search history.

(56) References Cited

U.S. PATENT DOCUMENTS

| | | | | |
|---|---|---|---|---|
| 2005/0129598 | A1* | 6/2005 | Chinn | B01D 53/1493 423/226 |
| 2014/0301929 | A1 | 10/2014 | Wang et al. | |
| 2015/0093313 | A1* | 4/2015 | Broderick | C07C 7/11 423/220 |
| 2017/0274319 | A1 | 9/2017 | Wang et al. | |

FOREIGN PATENT DOCUMENTS

| | | | |
|---|---|---|---|
| JP | 2015-507526 | 3/2015 | |
| JP | 2016-10760 | 1/2016 | |
| JP | 2016-83623 | 5/2016 | |
| JP | 2016-523691 | 8/2016 | |
| JP | 2017-507771 | 3/2017 | |
| JP | 2017-104775 | 6/2017 | |
| JP | 2020-521625 | 7/2020 | |
| WO | WO-2013114350 A1 * | 8/2013 | B01D 53/1425 |
| WO | 2014/178991 | 11/2014 | |
| WO | 2015/092427 | 6/2015 | |
| WO | 2018/213873 | 11/2018 | |

OTHER PUBLICATIONS

International Search Report issued Nov. 22, 2024 in International (PCT) Application No. PCT/JP2022/038582.

* cited by examiner

*Primary Examiner* — Mark Kopec
*Assistant Examiner* — Jaison P Thomas
(74) *Attorney, Agent, or Firm* — Wenderoth, Lind & Ponack, L.L.P.

(57) ABSTRACT

A composition for absorbing carbon dioxide including an ionic liquid (A) containing a cation and an anion, and a protic compound (B) having a relative permittivity at 25° C. of 20 or more, wherein the cation at least includes a cation represented by the formula (1), the anion includes an anion where an acid dissociation constant (pKa) at 25° C. of its conjugate acid in water is 4.5 or more, and the ratio of a value obtained by multiplying the number of hydroxyl groups of the protic compound (B) by the number of moles of the protic compound (B) to the number of moles of the ionic liquid (A) [number of moles of protic compound (B)/number of moles of ionic liquid (A)] is 0.2 to 1.0:

[Chem. 1]

(1)

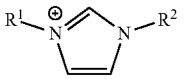

wherein $R^1$ and $R^2$ each independently represent a hydrogen or a C1-C6 linear alkyl group.

14 Claims, No Drawings

COMPOSITION FOR CARBON DIOXIDE ABSORPTION

TECHNICAL FIELD

The present invention relates to a composition for absorbing carbon dioxide.

BACKGROUND ART

Recently, climate change accompanied by global warming becomes a matter of concern.

It is said that the greenhouse gas most influential in global warming is carbon dioxide, and techniques for recovering carbon dioxide have been actively studied.

As one of the techniques for recovering carbon dioxide, ionic liquids have been receiving attention because of their large carbon dioxide absorption amounts.

For example, Patent Literature 1 discloses an acidic gas absorption solution containing an ionic liquid containing a cation and an anion, wherein the anion is a carboxylate ion, at least one of the cation or the anion is an ion having a hydroxyl group, the carboxylate ion includes a matrix which is a non-substituted or substituted, saturated or unsaturated hydrocarbon or heteroatom-containing hydrocarbon, and the heteroatom is at least one atom selected from the group consisting of an oxygen atom, a sulfur atom, and a phosphorus atom.

CITATION LIST

Patent Literature

Patent Literature 1: JP 2016-83623 A

SUMMARY OF THE INVENTION

Technical Problem

However, the ionic liquid has insufficient thermal stability and is decomposed under a high temperature environment, leading to a reduction in carbon dioxide absorption amount.

The present invention has been made in consideration of the above-mentioned problems. An object of the present invention is to provide a composition for absorbing carbon dioxide which enables a suppression in decomposition of an ionic liquid even under a high temperature environment, and can maintain the carbon dioxide absorption amount.

Solution to Problem

The present inventors, who have conducted extensive research to solve the above-mentioned problems, have gained knowledge that when the ionic liquid is placed under a high temperature environment, an SN2 reaction (nucleophilic attack to the cation by the anion constituting the ionic liquid) occurs to decompose the ionic liquid.

The present inventors, who have conducted further extensive research, have found that in a composition for absorbing carbon dioxide containing an ionic liquid containing a specific cation and a specific anion and a specific protic compound in a specific molar amount ratio, the SN2 reaction can be suppressed even when the composition is placed under a high temperature environment, and therefore decomposition of the ionic liquid can be suppressed, and the carbon dioxide absorption amount can be maintained. Thus, the present invention has been completed.

Specifically, the present invention relates to a composition for absorbing carbon dioxide including an ionic liquid (A) containing a cation and an anion, and a protic compound (B) having a relative permittivity at 25° C. of 20 or more, wherein the cation at least includes a cation represented by the formula (1), the anion at least includes an anion where an acid dissociation constant (pKa) at 25° C. of its conjugate acid in water is 4.5 or more, and the ratio of a value obtained by multiplying the number of hydroxyl groups of the protic compound (B) by the number of moles of the protic compound (B) to the number of moles of the ionic liquid (A) [(number of moles of protic compound (B)×number of hydroxyl groups of protic compound (B))/number of moles of ionic liquid (A)] is 0.2 to 1.0.

[Chem. 1]

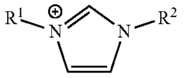

(1)

[wherein $R^1$ and $R^2$ each independently represent a hydrogen or a C1-C6 linear alkyl group.]

Advantageous Effects of Invention

The present invention can provide a composition for absorbing carbon dioxide which enables a suppression in decomposition of an ionic liquid even under a high temperature environment, and can maintain the carbon dioxide absorption amount.

DESCRIPTION OF EMBODIMENTS

The composition for absorbing carbon dioxide according to the present invention is a composition for absorbing carbon dioxide including an ionic liquid (A) containing a cation and an anion, and a protic compound (B) having a relative permittivity at 25° C. of 20 or more, wherein the cation at least includes a cation represented by the formula (1), the anion at least includes an anion where an acid dissociation constant (pKa) at 25° C. of its conjugate acid in water is 4.5 or more, and the ratio of a value obtained by multiplying the number of hydroxyl groups of the protic compound (B) by the number of moles of the protic compound (B) to the number of moles of the ionic liquid (A) [(number of moles of protic compound (B)×number of hydroxyl groups of protic compound (B))/number of moles of ionic liquid (A)] is 0.2 to 1.0.

In the composition for absorbing carbon dioxide according to the present invention, an SN2 reaction (nucleophilic attack to the cation by the anion constituting the ionic liquid) can be suppressed even when the composition is placed under a high temperature environment, and therefore decomposition of the ionic liquid (A) can be suppressed, and the carbon dioxide absorption amount can be maintained.

<Ionic Liquid (A)>

The composition for absorbing carbon dioxide according to the present invention contains an ionic liquid (A).

The ionic liquid (A) contains a cation and an anion.

The cation at least includes a cation represented by the formula (1):

[Chem. 2]

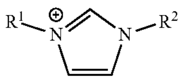

(1)

wherein $R^1$ and $R^2$ each independently represent a hydrogen or a C1-C6 linear alkyl group.

Examples of the cation specifically include 1-methylimidazolium, 1-ethylimidazolium, 1-propylimidazolium, 1-butylimidazolium, 1,3-dimethylimidazolium, 1-ethyl-3-methylimidazolium, 1-propyl-3-methylimidazolium, 1-butyl-3-methylimidazolium, 1-hexyl-3-methylimidazolium, and 1,3-diethylimidazolium.

Among these, 1-ethyl-3-methylimidazolium, 1-butyl-3-methylimidazolium, and 1,3-diethylimidazolium are preferred, and 1-ethyl-3-methylimidazolium and 1-butyl-3-methylimidazolium are also preferred from the viewpoint of the initial carbon dioxide absorption amount (the carbon dioxide absorption amount immediately after the composition for absorbing carbon dioxide according to the present invention is prepared).

The cation may contain a cation other than the cation represented by the formula (1).

Examples of the cation other than the cation represented by the formula (1) include cations having a hydroxyl group. From the viewpoint of the carbon dioxide absorption amounts [initial carbon dioxide absorption amount (immediately after the composition for absorbing carbon dioxide according to the present invention is prepared) and that under a high temperature environment], the proportion of the weight of the cation having a hydroxyl group relative to that of the cation represented by the formula (1) is preferably 10% by weight or less, more preferably 5% by weight or less. Particularly preferably, the cation having a hydroxyl group is not contained.

The amount of the cation other than the cation represented by the formula (1) is preferably 10 mol % or less relative to the total amount of the cations.

The anion at least includes an anion where an acid dissociation constant (pKa) at 25° C. of its conjugate acid in water is 4.5 or more.

Examples of the anion specifically include a carboxylate ion such as a saturated aliphatic carboxylate ion, an unsaturated aliphatic carboxylate ion, or an aromatic carboxylate ion. Among these, preferred is an anion represented by the formula (2), namely, a saturated aliphatic carboxylate ion from the viewpoint of the carbon dioxide absorption amount.

[Chem. 3]

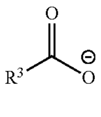

(2)

In the formula (2), $R^3$ represents a C1-C5 linear alkyl group.

The acid dissociation constant (pKa) indicates the acid dissociation constant (pKa) in an aqueous solution, for example, according to Kagaku Binran (II) (revised 4th edition, 1993, edited by The Chemical Society of Japan, Maruzen Company, Limited). A smaller value thereof indicates higher acid strength. Specifically, the acid dissociation constant pKa in an aqueous solution can be actually measured by measuring the acid dissociation constant at 25° C. using an infinite dissolution.

The carboxylic acid as a carboxylate ion source is preferably a saturated aliphatic carboxylic acid.

Examples of the saturated aliphatic carboxylic acid include acetic acid (pKa=4.6), propionic acid (pKa=4.7), butyric acid (pKa=4.8), isobutyric acid (pKa=4.9), valeric acid (pKa=4.9), pivalic acid (pKa=5.0), hydrangelic acid (pKa=4.9), and isovaleric acid (pKa=4.9).

The carboxylic acid as the carboxylate ion source is preferably acetic acid and propionic acid, more preferably acetic acid from the viewpoint of the initial carbon dioxide absorption amount (the carbon dioxide absorption amount immediately after the composition for absorbing carbon dioxide according to the present invention is prepared).

The anion is preferably acetate or propionate, more preferably acetate.

The carboxylic acid as the carboxylate ion source may be an unsaturated aliphatic carboxylic acid or an aromatic carboxylic acid.

Examples of the unsaturated aliphatic carboxylic acid include crotonic acid (pKa=4.7).

Examples of the aromatic carboxylic acid include 4-butoxybenzoic acid (pKa=4.5).

Besides of the anion described above, an anion having a hydroxyl group may be contained. From the viewpoint of the initial carbon dioxide absorption amount [initial carbon dioxide absorption amount (immediately after the composition for absorbing carbon dioxide according to the present invention is prepared) and the carbon dioxide absorption amount under a high temperature environment], the proportion of the weight of the anion having a hydroxyl group relative to that of the anions contained in the composition for absorbing carbon dioxide is preferably 10% by weight or less, more preferably 5% by weight or less. Particularly preferably, the anion having a hydroxyl group is not contained.

Examples of the carboxylic acid forming the anion having a hydroxyl group include 3-hydroxypropionic acid (pKa=4.5).

The anion may contain an anion where the acid dissociation constant (pKa) at 25° C. of its conjugate acid in water is less than 4.5.

From the viewpoint of the initial carbon dioxide absorption amount [initial carbon dioxide absorption amount (immediately after the composition for absorbing carbon dioxide according to the present invention is prepared) and the carbon dioxide absorption amount under a high temperature environment], the proportion of the weight of the anion where the acid dissociation constant (pKa) at 25° C. of its conjugate acid in water is less than 4.5 relative to the weight of the anion where the acid dissociation constant (pKa) at 25° C. of its conjugate acid in water is 4.5 or more is preferably 10% by weight or less, more preferably 5% by weight or less. Particularly preferably, the anion where the acid dissociation constant (pKa) at 25° C. of its conjugate acid in water is less than 4.5 is not contained.

The amount of the anion where the acid dissociation constant (pKa) at 25° C. of its conjugate acid in water is less than 4.5 is preferably 10 mol % or less relative to the total amount of the anions.

The amount of the anion other than the anion represented by the formula (2) is preferably 10 mol % or less relative to the total amount of the anions.

Examples of carboxylic acids where the acid dissociation constant (pKa) at 25° C. in water is less than 4.5 include benzoic acid (pKa=4.2), glycolic acid (pKa=3.8), difluoroacetic acid (pKa=1.3), dichloroacetic acid (pKa=1.4), and fluoroacetic acid (pKa=2.6).

The ionic liquid (A) can be prepared by a known method, and the optimal conditions can be selected according to the raw materials. Examples of the known method include a method of acting a carboxylic acid as the carboxylate ion source with a cation.

From the viewpoint of high carbon dioxide absorption performance and suitable suppression of decomposition of the ionic liquid (A), the ionic liquid (A) is preferably 1-ethyl-3-methylimidazolium acetate, 1-butyl-3-methylimidazolium acetate, or 1,3-diethylimidazolium acetate, and is also preferably 1-ethyl-3-methylimidazolium acetate or 1-butyl-3-methylimidazolium acetate.

The weight of the ionic liquid (A) is preferably 75% by weight or more and 98% by weight or less relative to the total weight of the composition for absorbing carbon dioxide according to the present invention.

When the weight of the ionic liquid (A) falls within the range above, the carbon dioxide absorption performance can be suitably imparted to the composition for absorbing carbon dioxide according to the present invention.

The weight of the ionic liquid (A) is more preferably 86% by weight or more and 95% by weight or less relative to the total weight of the composition for absorbing carbon dioxide according to the present invention.

<Protic Compound (B)>

The composition for absorbing carbon dioxide according to the present invention contains a protic compound (B) having a relative permittivity at 25° C. (hereinafter, also abbreviated to ε25 in some cases) of 20 or more.

Specifically, examples of the protic compound (B) include water (ε25:80), methanol (ε25:33), ethanol (ε25:25), 1-propanol (ε25:20), ethylene glycol (ε25:39), propylene glycol (ε25:32), glycerol (ε25:43), D-sorbitol (ε25:34), and diethylene glycol (ε25:32). Among these, preferred is at least one selected from the group consisting of water (ε25:80), methanol (ε25:33), 1-propanol (ε25:20), ethylene glycol (ε25:39), glycerol (ε25:43), and D-sorbitol (ε25:34), and more preferred is at least one selected from the group consisting of water (ε25:80), methanol (ε25:33), and 1-propanol (ε25:20).

In the present invention, ε25 is determined by measuring permittivity (ε) according to JIS C 2101:1999 [measuring the blank capacitance C0 (pF) before filling with a sample and the equivalent parallel capacitance Cx (pF) at the time of filling with the sample, and calculating the permittivity (ε) from the following expression], and determining the product of the permittivity (ε) and the relative permittivity of the air of 1.000585.

$$\varepsilon = Cx/C0$$

More preferably, the protic compound (B) is water from the viewpoint of suitably suppressing decomposition of the ionic liquid (A).

The weight of the protic compound (B) is preferably 2% by weight or more and 25% by weight or less relative to the total weight of the composition for absorbing carbon dioxide according to the present invention.

When the weight of the protic compound (B) falls within the range above, the SN2 reaction of the ionic liquid (A) can be suitably suppressed, and decomposition of the ionic liquid (A) can be suitably suppressed.

The weight of the protic compound (B) is more preferably 5% by weight or more and 14% by weight or less relative to the total weight of the composition for absorbing carbon dioxide according to the present invention.

<Composition for Absorbing Carbon Dioxide>

In the composition for absorbing carbon dioxide according to the present invention, the ratio of a value obtained by multiplying the number of hydroxyl groups of the protic compound (B) by the number of moles of the protic compound (B) to the number of moles of the ionic liquid (A) [(number of moles of protic compound (B)×number of hydroxyl groups of protic compound (B))/number of moles of ionic liquid (A)] is 0.2 to 1.0.

When the ratio of the number of moles of the ionic liquid (A) and the value obtained by multiplying the number of hydroxyl groups of the protic compound (B) by the number of moles of the protic compound (B) falls within the range above, the SN2 reaction of the ionic liquid (A) can be suppressed, and decomposition of the ionic liquid (A) can be suppressed.

The number of hydroxyl groups of the protic compound (B) can be determined by the chemical formula of the protic compound (B). When the protic compound (B) is an alcohol or a glycol, the number of hydroxyl groups of the protic compound (B) is the valency of the alcohol or glycol. When the protic compound (B) is a saccharide, the number of hydroxyl groups is the number of hydroxyl groups contained in one molecule of the saccharide. When the protic compound (B) is water, the number of hydroxyl groups is 1.

When the protic compound (B) is a mixture of a plurality of compounds, the value obtained by multiplying the number of hydroxyl groups of the protic compound (B) by the number of moles of the protic compound (B) can be determined by summing the values each obtained by multiplying the number of moles of each of the protic compounds (B) by the number of hydroxyl groups of corresponding one of the protic compounds (B).

The lower limit of the ratio of the value obtained by multiplying the number of hydroxyl groups of the protic compound (B) by the number of moles of the protic compound (B) to the number of moles of the ionic liquid (A) [(number of moles of protic compound (B)×number of hydroxyl groups of protic compound (B))/number of moles of ionic liquid (A)] is preferably 0.3 or more, more preferably 0.5 or more.

The composition for absorbing carbon dioxide according to the present invention may contain a component other than the ionic liquid (A) and the protic compound (B) (also referred to as different component).

Examples of the different component include aprotic organic solvents (such as esters such as γ-butyrolactone, nitriles such as acetonitrile, and ethers such as diglyme and triglyme).

The amount of the different component is preferably 50% by weight or less, more preferably 30% by weight or less, particularly preferably 10% by weight or less relative to the total weight of the composition for absorbing carbon dioxide according to the present invention.

The composition for absorbing carbon dioxide according to the present invention can be prepared by a known method. Specifically, it is sufficient that the ionic liquid (A) and the protic compound (B) are mixed in the above-mentioned molar ratio by a normal method.

In the composition for absorbing carbon dioxide according to the present invention, the carbon dioxide absorption amount at 40° C. is preferably 13 g/mol or more per mole of the initial ionic liquid (A) (immediately after the composition for absorbing carbon dioxide according to the present invention is prepared).

If the carbon dioxide absorption amount at 40° C. per mole of the initial ionic liquid (A) is 13 g/mol or more, it can be determined that sufficient carbon dioxide absorption performance is ensured.

The carbon dioxide absorption amount at 40° C. per mole of the initial ionic liquid (A) is more preferably 14 g/mol or more, still more preferably 15 g/mol or more.

The carbon dioxide absorption amount can be measured by the following method, for example.

(1) First, a two-necked recovery flask is capped with rubber caps, and the weight is measured (this weight is defined as "blank flask (air)").

(2) Then, the inside of the two-necked recovery flask is purged with carbon dioxide, and again the weight is measured (this weight is defined as "blank flask (carbon dioxide)").

(3) The inside of the two-necked recovery flask is purged with air, then, 10 g of the composition for absorbing carbon dioxide is placed thereinto, and the weight is measured (this weight is defined as "t=0 (air)").

(4) t=0 (air)+[blank flask (carbon dioxide)−blank flask (air)] is calculated, and this value is defined as the weight of the two-necked recovery flask containing 10 g of the composition for absorbing carbon dioxide under a carbon dioxide atmosphere (this weight is defined as "t=0 (carbon dioxide)").

(5) Carbon dioxide is transferred from a carbon dioxide tank to a gas collecting balloon, which is attached to the two-necked recovery flask, followed by purging with carbon dioxide. The temperature is adjusted to 40° C. under the atmospheric pressure.

(6) The flask is swung for 3 minutes, and then the weight of the two-necked recovery flask is measured. This operation is repeated until the change of the weight reaches 10 mg or less (measurement is performed every 3 minutes).

(7) The difference between t=0 (carbon dioxide) and the final weight in (6) is defined as the carbon dioxide absorption amount per 10 g of the composition for absorbing carbon dioxide.

(8) Finally, the carbon dioxide absorption amount is converted to the amount per mole of the composition for absorbing carbon dioxide.

In the above measurement, the carbon dioxide absorption amount is measured and calculated assuming that the weight of air per "volume of 10 g of the composition for absorbing carbon dioxide" is equal to the weight of carbon dioxide per "volume of 10 g of the composition for absorbing carbon dioxide" (i.e., [(weight of carbon dioxide per "volume of 10 g of the composition for absorbing carbon dioxide")−(weight of air per "volume of 10 g of the composition for absorbing carbon dioxide")]=0).

Moreover, in the above measurement, the carbon dioxide absorption amount is measured and calculated assuming that the volume of the composition for absorbing carbon dioxide before and after carbon dioxide absorption does not change.

In the composition for absorbing carbon dioxide according to the present invention, the carbon dioxide absorption amount at 40° C. per mole of the ionic liquid (A) after the composition is left to stand at 120° C. for 720 hours is preferably 12 g/mol or more.

If the carbon dioxide absorption amount at 40° C. per mole of the ionic liquid (A) after the composition is left to stand at 120° C. for 720 hours is 12 g/mol or more, it can be determined that the carbon dioxide absorption performance can be sufficiently maintained.

The carbon dioxide absorption amount at 40° C. per mole of the ionic liquid (A) after the composition is left to stand at 120° C. for 720 hours is more preferably 13 g/mol or more, still more preferably 14 g/mol or more.

The carbon dioxide absorption amount at 40° C. per mole of the ionic liquid (A) after the composition is left to stand at 120° C. for 720 hours can be measured and calculated by the same method as that of measuring and calculating the carbon dioxide absorption amount at 40° C. per mole of the above-mentioned initial ionic liquid (A) except that the composition for absorbing carbon dioxide immediately after prepared is replaced with the composition for absorbing carbon dioxide after the composition is left to stand at 120° C. for 720 hours.

The composition for absorbing carbon dioxide can be left to stand at 120° C. for 720 hours, for example, by placing the composition into a pressure-resistant vessel made of stainless steel or the like, sealing the vessel, and leaving the composition at 120° C. for 720 hours.

In the composition for absorbing carbon dioxide according to the present invention, the decomposition ratio of the ionic liquid (A) after the composition is left to stand at 120° C. for 720 hours is preferably 20% or less.

If the decomposition ratio of the ionic liquid (A) is 20% or less, it can be determined that the decomposition of the ionic liquid (A) is sufficiently suppressed.

The decomposition ratio of the ionic liquid (A) is preferably 17% or less, more preferably 13% or less, particularly preferably 10% or less, most preferably 6% or less.

An exemplary method of measuring the decomposition ratio of the ionic liquid (A) will be described using a case where 1-ethyl-3-methylimidazolium acetate is used as the ionic liquid (A).

The decomposition ratio is measured by 1H-NMR (nuclear magnetic resonance spectroscopy), and is calculated.

When 1-ethyl-3-methylimidazolium acetate is used as the ionic liquid (A), the 1-ethyl-3-methylimidazolium ring portion is decomposed to mainly 1-ethylimidazole and 1-methylimidazole.

Specifically, the decomposition ratio is measured by the following method.

(1) The composition for absorbing carbon dioxide is placed into a pressure-resistant vessel made of stainless steel or the like. The vessel is sealed, and is left to stand at 120° C. for 720 hours.

(2) After left to stand at 120° C. for 720 hours, the composition for absorbing carbon dioxide is dissolved in deuterated DMSO, and is measured by 1H-NMR.

(3) The molar ratio of 1-ethylimidazole to 1-ethyl-3-methylimidazolium and the molar ratio of 1-methylimidazole thereto are calculated where 1-ethyl-3-methylimidazolium is regarded as 1.

The chemical shifts of 1-ethylimidazole and 1-methylimidazole generated as a result of decomposition of 1-ethyl-3-methylimidazolium can be read from newly appearing peaks in 6 to 7.5.

(4) The decomposition ratio (%) is calculated as follows:

$$100\times[\text{molar ratio of (1-ethylimidazole)}+\text{molar ratio of (1-methylimidazole)}]$$

-continued $$/[\text{molar ratio of } (1-\text{ethylimidazole}) + \text{molar ratio of } (1-\text{methylimidazole}) + 1]$$

The present disclosure (1) is a composition for absorbing carbon dioxide including an ionic liquid (A) containing a cation and an anion and a protic compound (B) having a relative permittivity at 25° C. of 20 or more, wherein the cation at least includes a cation represented by the formula (1), the anion at least includes an anion where an acid dissociation constant (pKa) at 25° C. of its conjugate acid in water is 4.5 or more, and the ratio of a value obtained by multiplying the number of hydroxyl groups of the protic compound (B) by the number of moles of the protic compound (B) to the number of moles of the ionic liquid (A) [(number of moles of protic compound (B)×number of hydroxyl groups of protic compound (B))/number of moles of ionic liquid (A)] is 0.2 to 1.0:

[Chem. 4]

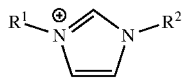

(1)

wherein $R^1$ and $R^2$ each independently represent a hydrogen or a C1-C6 linear alkyl group.

The present disclosure (2) is the composition for absorbing carbon dioxide according to the present disclosure (1), wherein the protic compound (B) is at least one selected from the group consisting of water, methanol, and 1-propanol.

The present disclosure (3) is the composition for absorbing carbon dioxide according to the present disclosure (1) or (2), wherein the cation is at least one selected from the group consisting of 1-ethyl-3-methylimidazolium and 1-butyl-3-methylimidazolium.

The present disclosure (4) is the composition for absorbing carbon dioxide according to any one of the present disclosures (1) to (3), wherein the anion at least includes an anion represented by the formula (2):

[Chem. 5]

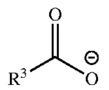

(2)

wherein $R^3$ represents a C1-C5 linear alkyl group.

The present disclosure (5) is the composition for absorbing carbon dioxide according to any one of the present disclosures (1) to (4), wherein the anion is at least one selected from the group consisting of acetate and propionate.

The present disclosure (6) is the composition for absorbing carbon dioxide according to any one of the present disclosures (1) to (5), wherein at least one of the cation or the anion contains no ion having a hydroxyl group.

The present disclosure (7) is the composition for absorbing carbon dioxide according to any one of the present disclosures (1) to (6), wherein the weight of the ionic liquid (A) is 75% by weight or more and 98% by weight or less relative to the total weight of the composition for absorbing carbon dioxide.

The present disclosure (8) is the composition for absorbing carbon dioxide according to any one of the present disclosures (1) to (7), wherein the weight of the protic compound (B) is 2% by weight or more and 25% by weight or less relative to the total weight of the composition for absorbing carbon dioxide.

EXAMPLES

Next, the present invention will be specifically described by way of Examples, but the present invention is not limited to Examples unless it deviates from the gist of the present invention. Unless otherwise specified, part(s) indicates part(s) by weight and % indicates % by weight.

The materials shown below were used in Examples and Comparative Examples.

<Ionic Liquid (A)>

1-ethyl-3-methylimidazolium acetate (cation: 1-ethyl-3-methylimidazolium, anion: acetate, available from Tokyo Chemical Industry Co., Ltd.)

1-butyl-3-methylimidazolium acetate (cation: 1-butyl-3-methylimidazolium, anion: acetate, available from Tokyo Chemical Industry Co., Ltd.)

1-ethyl-3-methylimidazolium propionate (cation: 1-ethyl-3-methylimidazolium, anion: propionate, prepared in Production Example 1 described later)

1-ethyl-3-methylimidazolium tetrafluoroborate (cation: 1-ethyl-3-methylimidazolium, anion: tetrafluoroborate, available from Tokyo Chemical Industry Co., Ltd.)

1,3-diethylimidazolium acetate (cation: 1,3-diethylimidazolium, anion: acetate, prepared in Production Example 2 described later)

Production Example 1

A mixture of 18 parts by weight of glyoxal (40% aqueous solution) and 10 parts by weight of formalin (37% aqueous solution) was placed into a reaction flask equipped with a stirrer, a thermometer, dropping funnels, a reflux cooler, and a nitrogen gas introducing pipe, and was formed into a homogenous solution with stirring. While nitrogen gas was being slightly flowing, the solution was heated to 40° C. Subsequently, while the reaction temperature was being kept at 35° C. to 45° C., a mixed solution of 64 parts by weight of ethylamine (70% aqueous solution) and 61 parts by weight of ammonia (28% aqueous solution) was added dropwise from a dropping funnel.

Next, after 35 minutes from the start of addition of the mixed solution of ethylamine and ammonia, a mixed solution of 127 parts by weight of glyoxal (40% aqueous solution) and 71 parts by weight of formalin (37% aqueous solution) was added dropwise from another dropping funnel over 4 hours. The mixed solution of ethylamine and ammonia was added dropwise over 4 hours 35 minutes, and the times to start the addition of these mixed solutions were shifted such that the addition of the mixed solution of ethylamine and ammonia and the addition of the mixed solution of glyoxal and formalin were ended at the same time. After the addition was ended, the solution was further reacted at 40° C. for 1 hour. Next, the product was dehydrated by gradually reducing the pressure at a temperature of 80° C. from normal pressure to a degree of pressure reduction of 5.3 kPa to give crude 1-ethylimidazole. Subsequently, this product was refined by simple distillation at a temperature 100° C. and a degree of pressure reduction of 0.7 kPa to give 1-ethylimidazole.

Next, 96 parts by weight of 1-ethylimidazole obtained, 135 parts by weight of dimethyl carbonic acid, and 192 parts by weight of methanol were placed into a stainless steel-made autoclave with a reflux condenser, and were homogeneously dissolved. Then, the temperature was raised to 150° C. A reaction was performed at a pressure of about 0.8 MPa for 70 hours to give a reaction product. The reaction product was subjected to 1H-NMR analysis, which revealed that 1-ethyl-3-methylimidazolium monomethylcarbonate salt was generated.

A 423 parts by weight portion of the obtained reaction product (salt concentration: 44% by weight) was extracted and placed into a flask, and under stirring, 74 parts by weight of propionic acid was gradually added dropwise under room temperature over about 30 minutes. Accompanied by the addition, bubbles of carbon dioxide gas were generated. After the addition was ended and then generation of bubbles was stopped, the reaction solution was transferred to a rotary evaporator to distill away the total amount of the solvent. Thereby, 184 parts by weight of a colorless transparent liquid was obtained in the flask.

This liquid was subjected to 1H-NMR analysis, which revealed that it was 1-ethyl-3-methylimidazolium propionate.

Production Example 2

A mixture of 31 parts by weight of acetic acid and 28 parts by weight of formalin (37% aqueous solution) was placed into a reaction flask equipped with a stirrer, a thermometer, dropping funnels, and a nitrogen gas introducing pipe, and was formed into a homogenous solution with stirring. While nitrogen gas was being slightly flowing, the temperature of the mixture was controlled to 0° C. to 10° C. using an ice bath. Subsequently, while the reaction temperature was being kept at 0 to 10° C., 45 parts by weight of ethylamine (70% aqueous solution) was added dropwise over 3 hours from a dropping funnel.

Next, after 1 hour from the end of the addition of ethylamine, 50 parts by weight of glyoxal (40% aqueous solution) was added dropwise over 10 minutes from another dropping funnel. After the addition was ended, a reaction was further performed at 20° C. to 30° C. for 2 hours.

Next, 150 parts by weight of diethyl ether was added to the obtained reaction product. These were stirred for 30 minutes, and then were left to stand. The diethyl ether layer was removed from the mixed solution separated into two layers. The aqueous layer was transferred to a recovery flask, and the total amount of water and unreacted acetic acid was distilled away by gradually reducing the pressure at a temperature of 100° C. from normal pressure to a degree of pressure reduction of 0.7 kPa. Thereby, 76 parts by weight of a yellow transparent liquid was obtained in the flask.

This liquid was subjected to 1H-NMR analysis, which revealed that it was 1,3-diethylimidazolium acetate.

<Protic Compound (B)>

1-propanol (available from Tokyo Chemical Industry Co., Ltd.)

methanol (available from Tokyo Chemical Industry Co., Ltd.)

water (deionized water)

ethylene glycol (available from Tokyo Chemical Industry Co., Ltd.)

glycerol (available from Tokyo Chemical Industry Co., Ltd.)

D-sorbitol (available from Tokyo Chemical Industry Co., Ltd.)

Examples 1 to 14, Comparative Examples 1 to 6

According to each of the compositions and proportions in Tables 1 to 3, the ionic liquid (A) and the protic compound (B) were blended under room temperature, and were stirred with a magnetic stirrer until a homogeneous liquid was prepared. Thus, 10 g of a composition for absorbing carbon dioxide was prepared.

<Carbon Dioxide Absorption Amount at 40° C. Per Mole of Initial Ionic Liquid (A)>

For the compositions for absorbing carbon dioxide prepared in Examples 1 to 14 and Comparative Examples 1 to 6, the carbon dioxide absorption amount at 40° C. per mole of the initial ionic liquid (A) (immediately after the composition was prepared) was measured and calculated by the procedures (1) to (8) below. The results are shown in Tables 1 to 3.

(1) A 50-mL two-necked recovery flask was capped with rubber caps, and the weight was measured (this weight was defined as “blank flask (air)”).

(2) Then, the inside of the 50-mL two-necked recovery flask was purged with carbon dioxide, and again the weight was measured (this weight was defined as “blank flask (carbon dioxide)”).

(3) The inside of the 50-mL two-necked recovery flask was purged with air, then, 10 g of the composition for absorbing carbon dioxide immediately after prepared was placed thereinto, and the weight was measured (this weight was defined as “t=0 (air)”).

(4) t=0 (air)+[blank flask (carbon dioxide)−blank flask (air)] was calculated, and this value was defined as the weight of the two-necked recovery flask containing 10 g of the composition for absorbing carbon dioxide under a carbon dioxide atmosphere (this weight was defined as “t=0 (carbon dioxide)”).

(5) Carbon dioxide was transferred from a carbon dioxide tank to a gas collecting balloon, which was attached to the 50-mL two-necked recovery flask, followed by purging with carbon dioxide. The temperature was adjusted to 40° C. under the atmospheric pressure.

(6) The flask was swung for 3 minutes, and then the weight of the two-necked recovery flask was measured. This operation was repeated until the change of the weight reached 10 mg or less (measurement was performed every 3 minutes).

(7) The difference between t=0 (carbon dioxide) and the final weight in (6) was defined as the carbon dioxide absorption amount per 10 g of the composition for absorbing carbon dioxide.

(8) Finally, the carbon dioxide absorption amount was converted to the amount per mole of the composition for absorbing carbon dioxide.

The carbon dioxide tank of carbon dioxide gas available from Iwatani Corporation was used.

<Decomposition Ratio of Ionic Liquid (A) after Composition was Left to Stand at 120° C. for 720 Hours>

The decomposition ratio of the ionic liquid (A) after the composition was left to stand at 120° C. for 720 hours was measured by 1H-NMR (nuclear magnetic resonance spectroscopy), and was calculated. Specifically, the decomposition ratio was measured and calculated by the procedures (1) to (4) below. The results are shown in Tables 1 to 3.

(1) The compositions for absorbing carbon dioxide prepared in Examples 1 to 14 and Comparative Examples 1 to 6 were placed into pressure-resistant vessels made of stainless steel. The vessels were sealed, and were left to stand at 120° C. for 720 hours.

(2) The compositions for absorbing carbon dioxide after left to stand at 120° C. for 720 hours were dissolved in deuterated DMSO, and were measured by 1H-NMR.

(3) In Examples 1 to 7 and 9 to 12 and Comparative Examples 1 to 3 and 5, the molar ratio of 1-ethylimidazole to 1-ethyl-3-methylimidazolium and the molar ratio of 1-methylimidazole thereto were calculated where 1-ethyl-3-methylimidazolium was regarded 1.

The chemical shifts of 1-ethylimidazole and 1-methylimidazole generated as a result of decomposition of 1-ethyl-3-methylimidazolium were read from newly appearing peaks in 6 to 7.5.

(4) In Examples 1 to 7 and 9 to 12 and Comparative Examples 1 to 3 and 5, the decomposition ratio (%) was $$100 \times [\text{molar ratio of } (1-\text{ethylimidazole}) + \text{molar ratio of } (1-\text{methylimidazole})] / [\text{molar ratio of } (1-\text{ethylimidazole}) + \text{molar ratio of } (1-\text{methylimidazole}) + 1]$$

(3) In Example 8 and Comparative Example 4, the molar ratio of 1-butylimidazole to 1-butyl-3-methylimidazolium and the molar ratio of 1-methylimidazole thereto were calculated where 1-butyl-3-methylimidazolium was regarded as 1.

The chemical shifts of 1-butylimidazole and 1-methylimidazole generated as a result of decomposition of 1-butyl-3-methylimidazolium were read from newly appearing peaks in 6 to 7.5.

(4) In Example 8 and Comparative Example 4, the decomposition ratio (%) was calculated as follows:

$$100 \times [\text{molar ratio of } (1-\text{butylimidazole}) + \text{molar ratio of } (1-\text{methylimidazole})]$$

-continued $$/[\text{molar ratio of } (1-\text{butylimidazole}) + \text{molar ratio of } (1-\text{methylimidazole}) + 1]$$

(3) In Examples 13 and 14 and Comparative Example 6, the molar ratio of 1-ethylimidazole to 1,3-diethylimidazolium was calculated where 1,3-diethylimidazolium was regarded as 1.

The chemical shift of 1-ethylimidazole generated as a result of decomposition of 1,3-diethylimidazolium was read from newly appearing peaks in 6 to 7.5.

(4) In Examples 13 and 14 and Comparative Example 6, the decomposition ratio (%) was calculated as follows:

$$100 \times [\text{molar ratio of } (1-\text{ethylimidazole})] / [\text{molar ratio of } (1-\text{ethylimidazole})]$$

<Carbon Dioxide Absorption Amount at 40° C. Per Mole of the Ionic Liquid (A) after Composition was Left to Stand at 120° C. for 720 Hours>

In the compositions for absorbing carbon dioxide prepared in Examples 1 to 14 and Comparative Examples 1 to 6, the carbon dioxide absorption amount at 40° C. per mole of the ionic liquid (A) after each composition was left to stand at 120° C. for 720 hours was measured.

The carbon dioxide absorption amount at 40° C. per mole of the ionic liquid (A) after the composition was left to stand at 120° C. for 720 hours was measured by the same method as that of measuring the carbon dioxide absorption amount at 40° C. per mole of the initial ionic liquid (A) except that the composition for absorbing carbon dioxide immediately after prepared was replaced by the composition for absorbing carbon dioxide after the composition was left to stand at 120° C. for 720 hours. The results are shown in Tables 1 to 3.

TABLE 1

| | | Example 1 | Example 2 | Example 3 |
|---|---|---|---|---|
| Composition of ionic liquid (A) | Cation | 1-Ethyl-3-methylimidazolium | 1-Ethyl-3-methylimidazolium | 1-Ethyl-3-methylimidazolium |
| | Anion | Acetate | Acetate | Acetate |
| Ionic liquid (A) (wt %) | | 98 | 95 | 90 |
| Composition of protic compound (B) | | Water | Water | Water |
| Protic compound (B) (wt %) | | 2 | 5 | 10 |
| Composition for absorbing carbon dioxide (wt %) | | 100 | 100 | 100 |
| pKa at 25° C. of conjugate acid of anion of ionic liquid (A) in water | | 4.6 | 4.6 | 4.6 |
| Relative permittivity at 25° C. of protic compound (B) | | 80 | 80 | 80 |
| (number of moles of protic compound (B) × number of hydroxyl groups of protic compound (B))/number of moles of ionic liquid (A) | | 0.2 | 0.5 | 1.0 |
| Carbon dioxide absorption amount per mole of initial ionic liquid (A) at 40° C. (g/mol) | | 15 | 15 | 15 |
| Decomposition ratio of ionic liquid (A) after left to stand at 120° C. for 720 hours (%) | | 17 | 12 | 6 |
| Carbon dioxide absorption amount per mole of ionic liquid (A) at 40° C. after left to stand at 120° C. for 720 hours (g/mol) | | 13 | 14 | 14 |

TABLE 1-continued

| | | Example 4 | Example 5 | Example 6 |
|---|---|---|---|---|
| Composition of ionic liquid (A) | Cation | 1-Ethyl-3-methylimidazolium | 1-Ethyl-3-methylimidazolium | 1-Ethyl-3-methylimidazolium |
| | Anion | Acetate | Acetate | Acetate |
| Ionic liquid (A) (wt %) | | 96 | 86 | 93 |
| Composition of protic compound (B) | | Methanol | Methanol | 1-Propanol |
| Protic compound (B) (wt %) | | 4 | 14 | 7 |
| Composition for absorbing carbon dioxide (wt %) | | 100 | 100 | 100 |
| pKa at 25° C. of conjugate acid of anion of ionic liquid (A) in water | | 4.6 | 4.6 | 4.6 |
| Relative permittivity at 25° C. of protic compound (B) | | 33 | 33 | 20 |
| (number of moles of protic compound (B) × number of hydroxyl groups of protic compound (B))/number of moles of ionic liquid (A) | | 0.2 | 0.9 | 0.2 |
| Carbon dioxide absorption amount per mole of initial ionic liquid (A) at 40° C. (g/mol) | | 15 | 15 | 15 |
| Decomposition ratio of ionic liquid (A) after left to stand at 120° C. for 720 hours (%) | | 18 | 12 | 20 |
| Carbon dioxide absorption amount per mole of ionic liquid (A) at 40° C. after left to stand at 120° C. for 720 hours (g/mol) | | 13 | 14 | 12 |

TABLE 2

| | | Example 7 | Example 8 | Example 9 | Example 10 |
|---|---|---|---|---|---|
| Composition of ionic liquid (A) | Cation | 1-Ethyl-3-methylimidazolium | 1-Butyl-3-methylimidazolium | 1-Ethyl-3-methylimidazolium | 1-Ethyl-3-methylimidazolium |
| | Anion | Acetate | Acetate | Propionate | Acetate |
| Ionic liquid (A) (wt %) | | 75 | 92 | 91 | 95 |
| Composition of protic compound (B) | | 1-Propanol | Water | Water | Ethylene glycol |
| Protic compound (B) (wt %) | | 25 | 8 | 9 | 5 |
| Composition for absorbing carbon dioxide (wt %) | | 100 | 100 | 10C | 100 |
| pKa at 25° C. of conjugate acid of anion of ionic liquid (A) in water | | 4.6 | 4.6 | 4.7 | 4.6 |
| Relative permittivity at 25° C. of protic compound (B) | | 20 | 80 | 80 | 38 |
| (number of moles of protic compound (B) × number of hydroxyl groups of protic compound (B))/number of moles of ionic liquid (A) | | 0.9 | 1.0 | 1.0 | 0.3 |
| Carbon dioxide absorption amount per mole of initial ionic liquid (A) at 40° C. (g/mol) | | 15 | 15 | 13 | 15 |
| Decomposition ratio of ionic liquid (A) after left to stand at 120° C. for 720 hours (%) | | 13 | 7 | 6 | 18 |
| Carbon dioxide absorption amount per mole of ionic liquid (A) at 40° C. after left to stand at 120° C. for 720 hours (g/mol) | | 13 | 14 | 12 | 13 |

| | Example 11 | Example 12 | Example 13 | Example 14 |
|---|---|---|---|---|
| Composition of ionic liquid (A) | 1-Ethyl-3-methylimidazolium Acetate | 1-Ethyl-3-methylimidazolium Acetate | 1,3-Diethylimidazolium Acetate | 1,3-lium Diethylimidazo Acetate |
| Ionic liquid (A) (wt %) | 95 | 95 | 91 | 85 |
| Composition of protic compound (B) | Glycerol | D-sorbitol | Water | Methanol |
| Protic compound (B) (wt %) | 5 | 5 | 9 | 15 |
| Composition for absorbing carbon dioxide (wt %) | 100 | 100 | 100 | 100 |
| pKa at 25° C. of conjugate acid of anion of ionic liquid (A) in water | 4.6 | 4.6 | 4.6 | 4.6 |
| Relative permittivity at 25° C. of protic compound (B) | 47 | 34 | 80 | 33 |
| (number of moles of protic compound (B) × number of hydroxyl groups of protic compound (B))/number of moles of ionic liquid (A) | 0.3 | 0.3 | 1.0 | 1.0 |

TABLE 2-continued

| | | | | |
|---|---|---|---|---|
| Carbon dioxide absorption amount per mole of initial ionic liquid (A) at 40° C. (g/mol) | 15 | 15 | 15 | 15 |
| Decomposition ratio of ionic liquid (A) after left to stand at 120° C. for 720 hours (%) | 18 | 18 | 1 | 1 |
| Carbon dioxide absorption amount per mole of ionic liquid (A) at 40° C. after left to stand at 120° C. for 720 hours (g/mol) | 13 | 13 | 15 | 15 |

TABLE 3

| | | Comp. Ex. 1 | Comp. Ex. 2 | Comp. Ex. 3 | Comp. Ex. 4 |
|---|---|---|---|---|---|
| Composition of ionic liquid (A) | Cation | 1-Ethyl-3-methylimidazolium | 1-Ethyl-3-methylimidazolium | 1-Ethyl-3-methylimidazolium | 1-Butyl-3-methylimidazolium |
| | Anion | Acetate | Acetate | Acetate | Acetate |
| Ionic liquid (A) (wt %) | | 100 | 85 | 75 | 100 |
| Composition of protic compound (B) | | — | Water | Methanol | — |
| Protic compound (B) (wt %) | | 0 | 15 | 25 | 0 |
| Composition for absorbing carbon dioxide (wt %) | | 100 | 100 | 100 | 100 |
| pKa at 25° C. of conjugate acid of anion of ionic liquid (A) in water | | 4.6 | 4.6 | 4.6 | 4.6 |
| Relative permittivity at 25° C. of protic compound (B) | | — | 80 | 33 | — |
| (number of moles of protic compound (B) × number of hydroxyl groups of protic compound (B))/number of moles of ionic liquid (A) | | 0.0 | 1.7 | 1.8 | 0.0 |
| Carbon dioxide absorption amount per mole of initial ionic liquid (A) at 40° C. (g/mol) | | 15 | 10 | 11 | 15 |
| Decomposition ratio of ionic liquid (A) after left to stand at 120° C. for 720 hours (%) | | 26 | 3 | 6 | 26 |
| Carbon dioxide absorption amount per mole of ionic liquid (A) at 40° C. after left to stand at 120° C. for 720 hours (g/mol) | | 11 | 10 | 10 | 11 |
| | | Comp. Ex. 5 | Comp. Ex. 6 | | |
| Composition of ionic liquid (A) | Cation | 1-Ethyl-3-methylimidazolium | 1,3-Diethylimidazolium | | |
| | Anion | Tetrafluoroborate | Acetate | | |
| Ionic liquid (A) (wt %) | | 100 | 100 | | |
| Composition of protic compound (B) | | — | — | | |
| Protic compound (B) (wt %) | | 0 | 0 | | |
| Composition for absorbing carbon dioxide (wt %) | | 100 | 100 | | |
| pKa at 25° C. of conjugate acid of anion of ionic liquid (A) in water | | -0.4 | 4.6 | | |
| Relative permittivity at 25° C. of protic compound (B) | | — | — | | |
| (number of moles of protic compound (B) × number of hydroxyl groups of protic compound (B))/number of moles of ionic liquid (A) | | 0.0 | 0.0 | | |
| Carbon dioxide absorption amount per mole of initial ionic liquid (A) at 40° C. (g/mol) | | 1 | 15 | | |
| Decomposition ratio of ionic liquid (A) after left to stand at 120° C. for 720 hours (%) | | 0 | 3 | | |
| Carbon dioxide absorption amount per mole of ionic liquid (A) at 40° C. after left to stand at 120° C. for 720 hours (g/mol) | | 1 | 11 | | |

From Tables 1 to 3, it was verified that in the compositions for absorbing carbon dioxide according to the present invention each including an ionic liquid (A) containing a specific cation and a specific anion, and a specific protic compound (B) where the ratio of the value obtained by multiplying the number of hydroxyl groups of the protic compound (B) by the number of moles of the protic compound (B) to the number of moles of the ionic liquid (A) is a specific ratio, decomposition of the ionic liquid was suppressed even when the composition was placed under a high temperature environment and the carbon dioxide absorption amount was maintained.

INDUSTRIAL APPLICABILITY

In the composition for absorbing carbon dioxide according to the present invention, decomposition of the ionic liquid can be suppressed even under a high temperature environment and the carbon dioxide absorption amount can be maintained. Thus, the composition for absorbing carbon dioxide according to the present invention can be used, for example, in separation of carbon dioxide contained in exhaust gases from chemical plants and steel plants, production of energy resources (natural gas, biogas, synthesis gas) while reducing carbon dioxide, a reduction in carbon dioxide in dispersed emission sources such as vehicles, but not limited to these exemplified fields.

The invention claimed is:

1. A composition for absorbing carbon dioxide comprising:

an ionic liquid (A) containing a cation and an anion; and a protic compound (B) having a relative permittivity at 25° C. of 20 or more, wherein the cation at least includes a cation represented by the formula (1), the anion at least includes an anion where an acid dissociation constant (pKa) at 25° C. of its conjugate acid in water is 4.5 or more, and the ratio of a value obtained by multiplying the number of hydroxyl groups of the protic compound (B) by the number of moles of the protic compound (B) to the number of moles of the ionic liquid (A) [(number of moles of protic compound (B)×number of hydroxyl groups of protic compound (B))/number of moles of ionic liquid (A)] is 0.2 to 1.0:

(1)

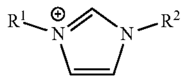

wherein $R^1$ and $R^2$ each independently represent a hydrogen or a C1-C6 linear alkyl group.

2. The composition for absorbing carbon dioxide according to claim 1, wherein the protic compound (B) is at least one selected from the group consisting of water, methanol, and 1-propanol.

3. The composition for absorbing carbon dioxide according to claim 2, wherein the cation is at least one selected from the group consisting of 1-ethyl-3-methylimidazolium and 1-butyl-3-methylimidazolium.

4. The composition for absorbing carbon dioxide according to claim 2, wherein the anion at least includes an anion represented by the formula (2):

(2)

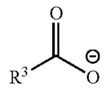

wherein $R^3$ represents a C1-C5 linear alkyl group.

5. The composition for absorbing carbon dioxide according to claim 2, wherein the anion is at least one selected from the group consisting of acetate and propionate.

6. The composition for absorbing carbon dioxide according to claim 2, wherein at least one of the cation or the anion contains no ion having a hydroxyl group.

7. The composition for absorbing carbon dioxide according to claim 2, wherein the weight of the ionic liquid (A) is 75% by weight or more and 98% by weight or less relative to the total weight of the composition for absorbing carbon dioxide.

8. The composition for absorbing carbon dioxide according to claim 2, wherein the weight of the protic compound (B) is 2% by weight or more and 25% by weight or less relative to the total weight of the composition for absorbing carbon dioxide.

9. The composition for absorbing carbon dioxide according to claim 1, wherein the cation is at least one selected from the group consisting of 1-ethyl-3-methylimidazolium and 1-butyl-3-methylimidazolium.

10. The composition for absorbing carbon dioxide according to claim 1, wherein the anion at least includes an anion represented by the formula (2):

(2)

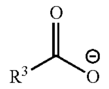

wherein $R^3$ represents a C1-C5 linear alkyl group.

11. The composition for absorbing carbon dioxide according to claim 1, wherein the anion is at least one selected from the group consisting of acetate and propionate.

12. The composition for absorbing carbon dioxide according to claim 1, wherein at least one of the cation or the anion contains no ion having a hydroxyl group.

13. The composition for absorbing carbon dioxide according to claim 1, wherein the weight of the ionic liquid (A) is 75% by weight or more and 98% by weight or less relative to the total weight of the composition for absorbing carbon dioxide.

14. The composition for absorbing carbon dioxide according to claim 1, wherein the weight of the protic compound (B) is 2% by weight or more and 25% by weight or less relative to the total weight of the composition for absorbing carbon dioxide.

* * * * *